United States Patent
Koerner

(10) Patent No.: US 7,049,933 B1
(45) Date of Patent: May 23, 2006

(54) IDENTIFICATION DEVICE DETECTION USING MULTIPLE SIGNAL COMBINATION

(75) Inventor: Steve J. Koerner, Mesa, AZ (US)

(73) Assignee: RF Code, Inc., Mesa, AZ (US)

( * ) Notice: Subject to any disclaimer, the term of this patent is extended or adjusted under 35 U.S.C. 154(b) by 416 days.

(21) Appl. No.: 09/648,494

(22) Filed: Aug. 25, 2000

(51) Int. Cl.
*H04Q 1/00* (2006.01)

(52) U.S. Cl. ................................. 340/10.1; 340/10.4

(58) Field of Classification Search ............ 340/572.7, 340/10.1, 825.49, 10.2
See application file for complete search history.

(56) References Cited

U.S. PATENT DOCUMENTS 5,276,430 A * 1/1994 Granovsky ................ 340/10.2
5,742,237 A * 4/1998 Bledsoe .................... 340/10.2

* cited by examiner

*Primary Examiner*—Brian Zimmerman
(74) *Attorney, Agent, or Firm*—Allen J. Moss; Squire, Sanders & Dempsey L.L.P.

(57) ABSTRACT

A method for determining whether an radio frequency identification (RFID) device is detected, includes: (a) selecting a plurality of different antenna patterns from a predetermined multiplicity of antenna patterns; (b) determining a plurality of binary results; (c) selecting, from a plurality of predetermined methods, a method for forming a logical combination; and (d) determining that the identification device is detected by forming a logical combination of the plurality of binary results according to the selected method. Each binary result is responsive to whether a respective communication link provides a respective signal having a respective amplitude exceeding a respective threshold. Each communication link is operative in accordance with at least one of the selected antenna patterns.

13 Claims, 8 Drawing Sheets

IDENTIFICATION DEVICE DETECTION USING MULTIPLE SIGNAL COMBINATION

FIELD OF THE INVENTION

Embodiments of the present invention relate to object identification systems of the type having multiple transmitting and receiving devices that share a common communication medium; and, to methods for establishing communication in the presence of large numbers of such devices especially where communication is subject to reception of signals on multiple paths.

BACKGROUND OF THE INVENTION

Conventional data communication systems have been applied to accomplish object identification using the medium of radio broadcast. Such radio frequency identification (RFID) systems find application in the fields of materials handling, inventory control, and generally in the field of tracking personnel, objects, and animals. Identification devices are of three known types: passive, active identification devices of the beacon type, and active identification devices of the transceiver type. In an exemplary arrangement, a system may include an interrogator (or system receiver for beacons) and several thousand identification devices. Each identification device is typically packaged as a low-cost or disposable label or tag and placed on an object, animal, or person to be tracked. Each identification device is manufactured using integrated circuit technology, programmed with a unique identifier, and assembled with a printed circuit antenna to form a flat assembly for incorporation into the label or tag. Typically, the interrogator (or system receiver) has a fixed location, while identification devices move from time to time in and out of the communication field of the interrogator (or system receiver). It is highly desirable to accurately and quickly identify identification devices from a population which may number in the billions. At the same time, it is highly desirable to reduce the cost of each identification device.

Accurate and reliable detection of identification devices is made difficult by a number of factors including, for example, (a) identification devices have a limited amount of power available to operate when required to provide a radio transmission; (b) the orientation of the identification device antenna may be unsuitable for absorbing sufficient power from a signal transmitted to it; (c) the orientation of the antenna of the identification device may be unsuitable for providing a transmitted signal sufficient for accurate reception by the interrogator (or system receiver); (d) multiple signals may arrive at an interrogator (or system receiver) based on the same transmission by an identification device due, inter alia, to radio frequency reflections in the environment; and (e) identification devices that transmit simultaneously may cause a so-called collision.

There remains a need for an object identification system suited for coordinating the use of a common medium among potentially billions of identification devices for detection, interrogation, and/or control activities to be accomplished in a limited time. In addition, there remains a need in some applications to minimize the circuitry, firmware, and software complexity required at each identification device, to extend the operating range of communication, and to support larger numbers of individual identification numbers perhaps at the expense of complexity at the interrogator (or system receiver). Without these improvements, the size and cost per identification device cannot be reduced to permit new and improved object identification systems that employ inexpensive disposable identification devices such as identification tags, baggage tags, inventory labels, and the like.

SUMMARY OF THE INVENTION

A method, according to various aspects of the present invention, for determining whether an identification device is detected, includes: (a) selecting a plurality of different antenna patterns from a predetermined multiplicity of antenna patterns; (b) determining a plurality of binary results; (c) selecting, from a plurality of predetermined methods, a method for forming a logical combination; and (d) determining that the identification device is detected in accordance with performing the method to form a logical combination in accordance with the plurality of binary results. Each binary result is responsive to whether a respective communication link provides a respective signal having a respective amplitude exceeding a respective threshold. Each communication link is operative in accordance with at least one of the selected antenna patterns.

By selecting several antenna patterns, each contributing to a respective binary result, a logical combination of binary results may provide detection with a higher probability of detecting an identification device that is within range of the one or more selected antennas (an in-range identification device) and/or a lower probability of detecting an identification device that is not within range of the one or more selected antennas (a not-in-range identification device).

Consequently, inter alia, more accurate and more reliable detection of identification devices may be obtained and more rapid determination of an unknown population of identification devices may be obtained.

In an object identification system according to various aspects of the present invention, a communication link utilizing one of the selected antennas may be used to provide power to identification devices via a transmitted signal. By using a selected antenna for this function, the probability of an in-range identification device absorbing sufficient power from the transmitted signal increases and/or the probability of a not-in-range identification device absorbing sufficient power from the transmitted signal decreases. Further, a communication link utilizing one of the selected antennas may be used for communicating with identification devices by transmitting to them, receiving from them, or both transmitting and receiving. By using one or more selected antennas and/or a selected method of combining binary results determined from use of one or more of the selected antennas, the probability of communicating with an in-range identification device without error is increased and/or the probability of communicating with a not-in-range identification device without error is decreased. Providing power and/or communicating without error may be made less dependent on the orientation of the antenna of an in-range identification device. Consequently, more accurate and more reliable detection of identification devices may be obtained and communication with an initially unknown number of identification devices may take less time. Less expensive identification devices may be utilized where expense incurs from multiple or omnidirectional antenna structures on the identification device.

Use of more than one link for powering and/or communicating with identification devices may be used to advantage in environments where multiple signal paths may link an identification device with a plurality of selected antennas. By combining the respective binary results associated with respective reflected radio frequency signals, more accurate and more reliable detection of identification devices may be obtained and communication with an initially unknown number of identification devices may take less time.

Use of more than one link for powering and/or communicating with identification devices may be used to advantage in environments where multiple identification devices may transmit simultaneously, causing a so-called collision. By selecting antennas for powering or communicating, a subset of identification devices may be enabled to transmit. The probability of a collision may be decreased and more accurate and more reliable communication with an initially unknown number of identification devices may take less time.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENT

Figure 1:
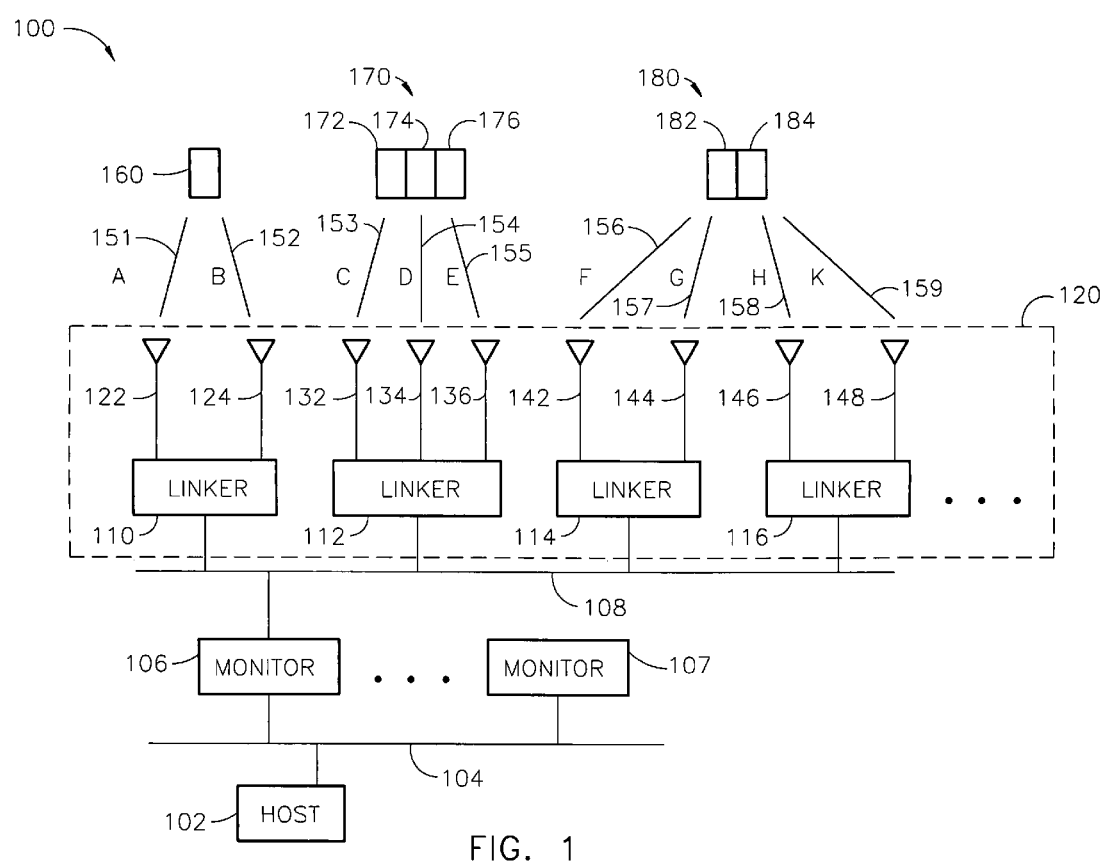
FIG. 1 is a functional block diagram of an object identification system according to various aspects of the present invention.

An object identification system, according to various aspects of the present invention, provides communication between a monitor and an object, while the monitor and object are within communicating range. Each object, for example, may include a radio frequency identification (RFID) device having an antenna used for communication. Communication, as used herein, may be used to accomplish one or more purposes including: (a) to detect presence of an identification device (e.g., to locate an object as in a zone), (b) to provide operative power to an identification device, (c) to determine an identification device identification, (e) to receive data from an identification device, or (f) to send data to one or more identification devices. Transmitted power levels may vary according to the range suitable for the communication. For example, objects may be detected at a comparatively lower transmitted power level to avoid collisions as discussed above. Communication may be accomplished using the same or different media, frequencies, or modulations for different purposes (e.g., magnetic induction, radio, infrared light, or acoustics using amplitude modulation, frequency shift keyed modulation, or pulse code modulation, to name a few representative alternatives). Different media, frequencies, or modulations may be used simultaneously or at different times for the same purpose. According to various aspects of the present invention, communication is established, overcoming the problems described above including variation in the orientation of each object antenna, variation in coupling among object antennas, and variation in discontinuities along a communication path (e.g., proximity of object antennas to surfaces that may interfere with communication by reflection, absorption, or refraction). For example, object identification system 100 includes host computer 102, networks 104 and 108, monitor 106 (representative of any number of monitors coupled to networks 104 and 108), linkers 110, 112, 114, 116 (representative of any number of linkers coupled to network 108), and identification devices 160, 170, and 180 (representative of any number and orientation of in-range identification devices). Host computer 102 may include any computer system having computing capacity and interfaces for supporting data communication on network 104 among one or more monitors 106–107. A conventional office computer system may be used. Host computer 102 may operate to receive notice of objects detected or identified by one or more monitors 106–107 and to conduct any otherwise conventional business process in response to such notice. As a representative example, host computer may provide inventory accounting, point of sale services, materials handling, automatic data collection, electronic article surveillance, or electronic access control in response to object detection or identification where objects may include personnel badges, identification tags, transportation tags, inventory labels, electronic keys, authorization devices, or price tags.

Network 104 may include any network for data transfer (e.g., an internet, a wide area network, a local area network using cable, telephony, or wireless technology) between a monitor and a host computer. In addition, network 104 may support data transfer between one or more monitors 106–107. Any conventional network protocol may be used, for example a protocol that includes messages for assigning processing tasks among monitors that operate in parallel (e.g., independently or redundantly) or in cooperation (e.g., sharing control information or computed results).

Network 108 may include any network for data transfer (e.g., an internet, a wide area network, a local area network using cable, telephony, or wireless technology) between a linker and a monitor; or, between linkers. Any conventional network protocol may be used, for example a protocol that includes messages for assigning processing tasks among linkers that operate in parallel (e.g., independently or redundantly) or in cooperation (e.g., sharing control information or computed results). Networks 104 and 108 may be logically separated (e.g., monitor 106 may serve as a conventional firewall) or they may be logically or physically integrated.

In an alternate implementation, monitor 106 and network 104 are eliminated and a host computer coupled to network 108 performs all functions discussed above for host 102 as well as all functions discussed below for a monitor. In system 100 as shown, monitors 106–107 serve, inter alia, to reduce the data volume and increase the time available for responding to messages on a network coupled to a host computer (i.e., network 104).

Monitors 106–107 may receive commands from host computer 102 and provide reports to host computer 102 via network 104. Commands may include requests by host computer 102 for the status of any linker 110–116, of any monitor (e.g., to monitor 106 concerning itself or to monitor 106 concerning another monitor 107 cooperative with monitor 106), of network 104, or of network 108. Commands from host 102 may dictate to monitor 106 the selection and configuration of links to be used for communication with identification devices. Further, host computer 102 may, by suitable commands, request notice of objects detected or a list of object identifications currently within communication range of any monitor (or cooperating group of monitors), and/or request raw data from which host computer 102 may detect objects or determine such a list. Finally, host computer 102, using suitable commands to monitor 106–107, may direct cooperation of monitors for performing any of the functions discussed above. For example, a monitor may assume the role of the host indefinitely or for a temporary period. Host computer 102 may be omitted when a monitor performs functions of a host, for example, as discussed above.

A monitor includes any subsystem that communicates with one or more objects and provides results of such communication. A monitor may include communication and/or computation capability. A monitor may communicate at one or more levels of protocol (e.g. decoding/coding radio signals, disassembly/assembly of messages, and/or computation related to detection/interrogation methods). For example, a monitor may include a radio receiver as discussed above. In another implementation, a monitor includes both a radio transmitter and radio receiver (e.g., for use with transponders). In yet another implementation, a monitor does not transmit or receive into the media common to identification devices but controls other subsystems that do (e.g., linkers 110–116). In such a case, a monitor may include software and/or circuits for receiving messages and responding to messages (e.g., messages to/from subsystems, messages to/from identification devices, and/or messages to/from host) without operating directly on radio signals.

Results of detection of identification devices may be provided to an operator at the monitor (e.g., when host computer 102 is omitted) or to a host computer for processing as discussed above. System 100 may include one or more monitors, several monitors being used for redundancy or when the capacity of a single monitor is exceeded by physical distribution of objects or the desired extent of communication with an expected population of objects in perhaps a limited time. For example, monitors 106–107 may be functionally equivalent and arranged in several zones (e.g., geographic territories). Zones may overlap geographically when, for example, each zone uses a different communication medium, frequency, modulation, protocol, or address group. The location of an object as within a particular zone may be ascertained by communication with one or more monitors 106–107. Movement of an object from one zone to another may be determined by host computer 102 by conventional comparison techniques based on suitable reports from monitors 106–107.

A linker includes any apparatus that provides a physical interface to the common medium (or media) used for communication with identification devices. For identification devices that communicate using radio frequencies, a linker includes one or more antennas. Linkers may operate independently or may cooperate in groups of linkers. Therefore, the antenna or antennas coupled to one linker may constitute an antenna system or may be part of an antenna system that includes the antennas coupled to one or more other linkers. An antenna system includes any system for using one or more antennas for receiving or sending messages between a monitor and one or more objects. For example, antenna system 120 couples to monitors 106–107 via bus 108 and further includes linker 110 (having antennas 122 and 124), linker 112 (having antennas 132, 134, 136), linker 114 (having antennas 142, 144), and linker 116 (having antennas 146 and 148). When communication from one or more of several linkers is limited to providing operative power, the receiving antenna functions for those linkers and antenna subsystems may be omitted.

As shown, an antenna represents any transducer of energy used in communication including, for example, a lens for infrared light energy or a horn or structure for acoustic energy. An alternate antenna system includes one or more modules (e.g., replaceable components) for reconfiguring operation from any communication medium or frequency band to another medium or frequency band.

In an implementation having a monitor that includes radio receiver and/or transmitter circuits, a linker may include circuitry for antenna selection, antenna squelching, antenna impedance matching (i.e., tuning), received signal processing (e.g., analog detector, demodulator, preamplifier, analog-to-digital converter, and/or pulse counter or timing analyzer circuits), pre-transmit signal processing (e.g., gated oscillator, code converter, digital-to-analog converter, digital-to-pulse converter, amplifier, modulator, message header generator, sync signal generator, and message trailer generator), and error detection (e.g., CRC generator and/or checker). When the monitor does not include the radio circuits, the linker may further include one or more receivers and/or one or more transmitters. In either case the linker may include a processor for accepting commands from bus 108, providing control signals to the circuits described above, performing methods that cooperate with such circuits to accomplish functions described above, and providing status, data, and error messages.

Detection of an identification device so as to provide indicia of detection in host computer 102 (or in one or more monitors 106–107; or in one or more linkers 110–116) may involve one or more antennas. For example, communication resulting in indicia of detection of identification device 160 is illustrated by links 151 and 152; for object 170 by links 153, 154, and 155; and for object 180 by links 156, 157, 158, and 159. Each link may include any number of signals in either direction between antennas and identification devices. For example, a link may represent any one or more signals of the type transmitted or received in an object identification system described in U.S. patent application Ser. No. 09/372,274 filed Aug. 11, 1999 by James L. Rodgers et. al, incorporated herein by this reference. It is not necessary for the same antenna node to operate for sending and receiving communication to a particular identification device. For example, antenna 122 may provide a power signal to identification device 160 on link 151 and antenna 124 may receive a beacon signal provided by identification device 160.

Each identification device may have one or more antennas. The orientation of an antenna of an identification device, as discussed above, includes the orientation of the identification device antenna with respect to an antenna used by a linker for communication with identification devices and includes the orientation of the identification device antenna with respect to other identification device antennas. When essentially planar antennas are used in identification devices, coupling of antennas for power transfer from a linker to an identification device may be primarily by magnetic fields. Such coupling may decrease as an identification device antenna orientation differs from coplanar (or parallel planes) with respect to a linker antenna and other nearby identification device antennas. When planar antennas are coplanar (or in parallel planes) with respect to each other, an identification device may receive power from identification devices and the coupling of multiple resonant circuits (e.g., where each identification device has a resonant circuit formed with or coupled to the antenna) may effect the behavior of one or more of such resonant circuits. For example, when each identification device has a resonant circuit with a resonant frequency when operated in isolation, a group of identification devices may have a peak of energy absorption at a different (e.g., lower) frequency, herein called a stack resonant frequency. Some identification devices in a stack may not be coupled to the same extent as other (e.g., a majority) identification devices and so may absorb energy more efficiently at a frequency between the resonant frequency in isolation and the stack resonant frequency of the majority. In other words, a non-uniform stack of identification devices may exhibit several stack resonant frequencies.

In general, a link as discussed above, includes a signal transmitted by a transmitter and received by a receiver (or power circuit). A link may involve either an in-range identification device or a not-in-range identification device. Whether or not the link involves an in-range identification device depends on factors including the antenna pattern of the transmitter, the antenna pattern of the receiver, the distance traveled by RF energy related to the signal, properties of the media through which the energy passes, and properties of the environment contributing to absorption, reflection and refraction of the energy. One or more factors may vary in time during the duration of communication via a link. An antenna pattern is a spacial (e.g., 2- or 3-dimensional) representation of performance of an antenna (or array of antennas). An antenna pattern for a transmitting antenna describes radiated field strength as measured (or predicted) at various points. An antenna pattern for a receiving antenna may describe a minimum field strength at various points that will provide in the antenna a prescribed electrical signal.

Communication via a link may include several such signals of various durations overlapping or separated in time. When detection of an identification device involves several signals (e.g., power, ringing, reply, interrogation, further reply, etc.), for example, due to system architecture, protocol, and reliability criteria, each signal individually and each combination of one or more such signals contributes to whether the identification device is in-range or not-in-range. This multidimensional definition of in-range may be better understood by more closely considering a simpler case in one dimension, i.e., link distance.

Figure 8:
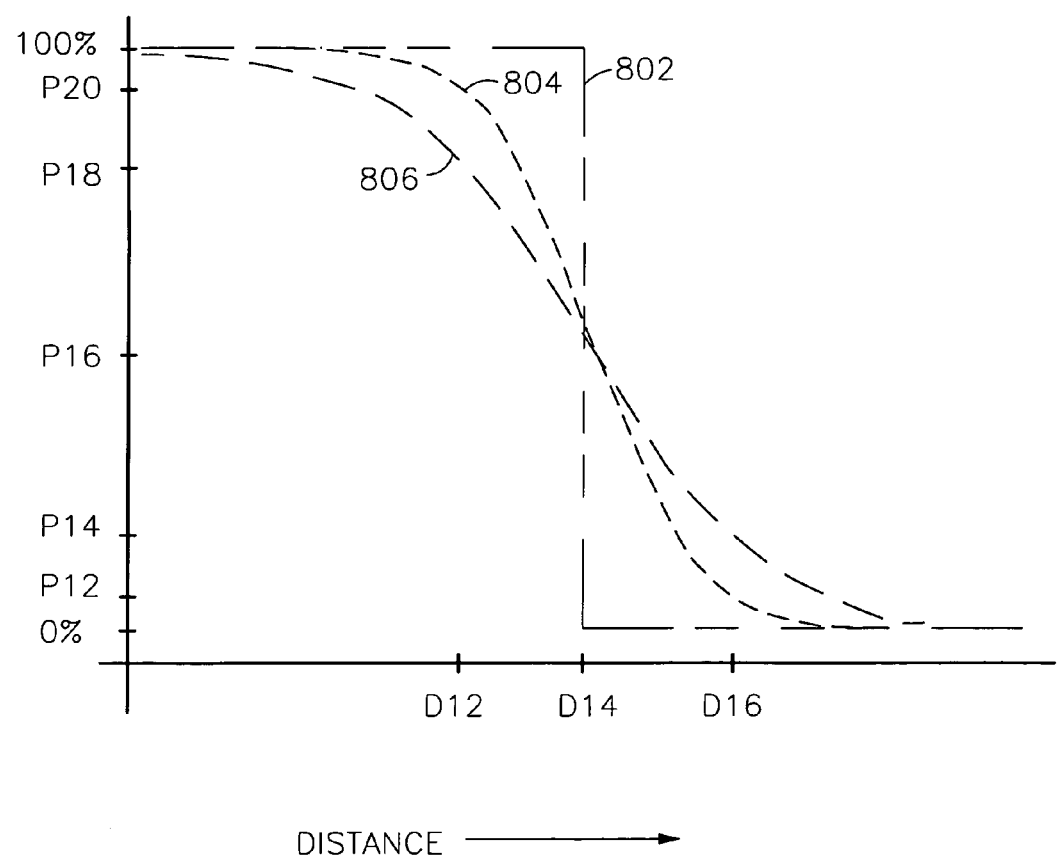
FIG. 8 is a graph of the probability of detecting an identification device as a function of the distance over which a communication link extends.

As an ideal goal, the probability of detecting all in-range identification devices should be 100% and the probability of detecting as in-range any not-in-range identification devices should be 0%. This ideal is illustrated in FIG. 8 where in-range is defined simply with reference to one variable, link distance, defined as the distance between communicating devices (e.g., a linker and an identification device). As shown, when the link distance is less than distance D14, the identification device is in-range. The probability of detection (curve 802) is 100% at all link distances less than or equal to distance D14. Beyond distance D14, the probability of detection is 0%. Because the ideal is not realizable for many reasons (e.g., variation in antenna coupling, noise floor, and others discussed above), a realistic probability varies with distance as shown by curve 806. For example, the probability of detecting an identification device at distance D12 is not certainty; the probability P18 corresponding to D12 at curve 806 is less than 100% (e.g., 80%).

When the probability is not 100%, two types of errors may be present in any proportion. First, identification devices that are not-in-range may be detected (so called false positive detection). Second, identification devices that are in-range may not be detected (so-called missed or incomplete detection). Incomplete detection may dominate the actual errors at distance D12; and, false positive detection may dominate the actual errors at distance D16. At distance D14, the probability of detection of an in-range identification device (P16) may be close to 50%. This link distance is herein called the threshold link distance.

Figure 3:
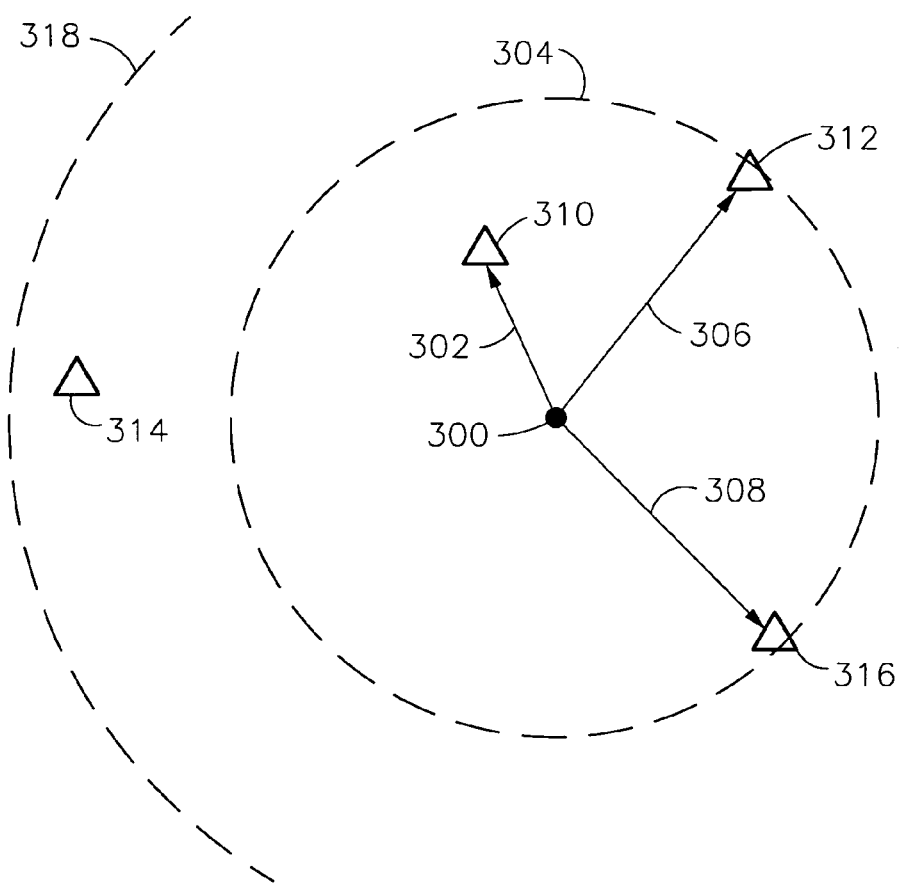
FIG. 3 is a diagram of exemplary positions of in-range and not-in-range identification devices.

According to various aspects of the present invention, the threshold link distance (i.e., at which detection of all in-range identification devices is about 50%) may be adjusted. Any conventional mechanism for adjusting link reliability may be used as an adjustment, including, circuits and/or software for adjusting the amount of transmitted energy (e.g., for a link used to transmit power to an identification device; or, an interrogation signal to an identification device), adjusting the amount of antenna coupling at the transmitter or receiver of the link (e.g., decreasing any mismatch including electronics to physical antenna; or, antennas to each other through the medium as orientation, etc.), and/or adjusting receiver sensitivity. For example, referring again to in-range defined simply by link distance, where probability is equal in all physical directions (e.g., perfect omnidirectional antennas are used for the transmitter and receiver of the link), in-range identification devices may be considered to lie within a circular contour on a plane 304 as shown in FIG. 3. An identification device 310 may be considered in-range (e.g., corresponding to distance D12 of FIG. 8) and an identification device 314 may be considered not-in-range (e.g., corresponding to distance D16 of FIG. 8). Identification devices 312 and 316 may represent devices that happen to exist at distance D14; or, devices 312 and 316 may, according to various aspects of the present invention, be placed to demarcate contour 304.

For example, one or more identification devices may be known to exist on any desired contour (regardless of the shape of the contour), and the threshold link distance in the direction of the known identification device may be adjusted in a sequence of tests to provide over several sample readings a predetermined target probability of detection (e.g., 50%; or, more than 50% for a safety margin). Use of the hardware and/or software settings (e.g., transmitter power, antenna orientation, receiver sensitivity, etc. as discussed above) that provided the desired link distance during such tests may then be used in the tested direction(s) or used for determining (according to a model of link distance in the environment) suitable settings for other directions and/or other link distances.

A first group of settings corresponding to a first link distance may be used with a second group of settings corresponding to an incrementally longer link distance to help ascertain at what physical distance a particular identification device may lie. For example, identification device 314 may be determined to lie between link distance radii corresponding to circular contours 304 and 318 because identification device 314 responds less than 50% of the time with the first group of settings and more than 50% of the time with the second group of settings.

According to various aspects of the present invention, the existence of multiple paths for one link may be used to establish system performance closer to the ideal curve 802, for example at curve 804. A system operative in accordance with curve 804 will exhibit a lower probability of false positives and a lower probability of incomplete detections. A system according to various aspects of the present invention is operative on a curve such as curve 804 in an environment where a link comprises multiple paths. As shown in FIG. 3, each link 302, 306, and 308 includes just one segment (a portion of a line) between the ends of the link (e.g., 300 and 310 for path 302). However, as a practical matter, irregularities in the medium may give rise to multiple physical communication paths for one link. The medium within a facility may be bounded by reflecting and absorbing surfaces. For example, facility 200 of FIG. 2 includes walls 202 and 204 joined at a square corner, walls 206 and 208 joined at a 225 degree corner and forming a hallway between walls 204 and 206, and wall 210 generally facing the aforementioned walls. A link between points 216 and 218 may include three paths: (a) segment 232 and the reflection from wall 202 providing segment 234; (b) segment 236 and the reflection from wall 208 providing segment 238; and (c) segment 230 arriving without reflections. These three paths have different effective link distances (e.g., the sum of segments on each path may correspond to an effective link distance).

Figure 2:
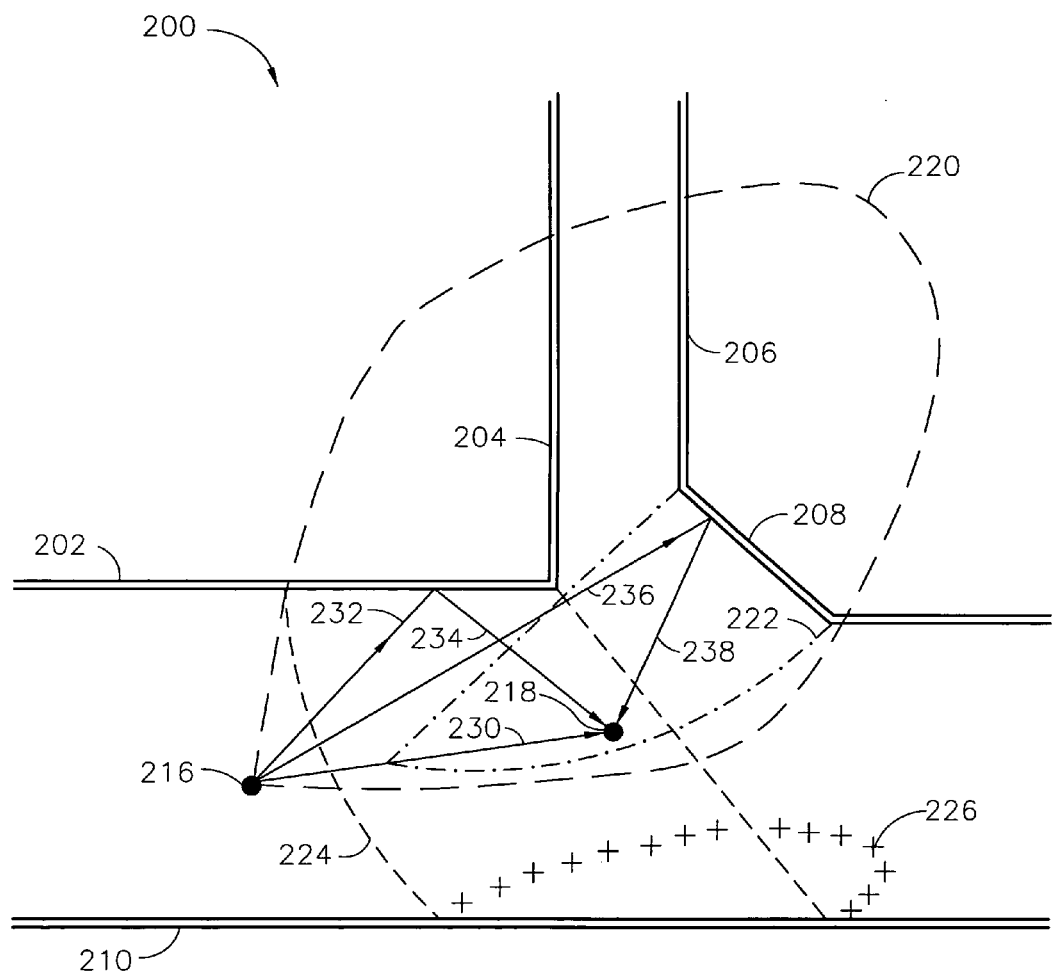
FIG. 2 is floor plan of a facility that includes an exemplary installation of a portion of the system of FIG. 1.

Planar contour 220 of FIG. 2 in long dash lines illustrates a locus of points having 50% probability of detection of an identification device. As representing an RF link, the antenna at point 216 is not omnidirectional so contour 220 (instead of having a circular shape centered at point 216) has a tear drop shape extending generally toward wall 208. In other words, planar contour 220 represents a portion of an antenna pattern. A first portion of the extremity of pattern 220 is reflected from wall 208 as shown in dash-dot lines 222. A second portion of the extremity of pattern 220 is reflected from wall 202 toward wall 210 as shown in short dash lines 224. A portion of the extremity of pattern 220 is reflected from wall 202 and then from wall 210 as shown in plus line 226. Note that paths 232 and 234 are in-range and correspond to a first reflection within short dash lines 224; paths 236 and 238 are in-range and correspond to a first reflection within dash-dot lines 222; and that all points of the second reflection within plus line 226 are not in-range.

Of course, determination of in-range with reference to link distance is not restricted to reference to a contour in a plane. For example, a locus of points in three dimensions may by analysis or test be determined to exhibit probability consistent with a model for defining in-range where all such points are part of a regular surface (e.g., a sphere or a toroid) or an irregular surface (e.g., a multi-lobed surface having a variety of lobe volumes). Because antennas (and reflected RF energy) exhibit patterns that may be directional, polarized, or a combination of directional and various polarizations, the determination of in-range with reference to link distance for a first antenna (e.g., horizontally polarized) may be substantially unrelated to a determination of in-range with reference to link distance for a second antenna (e.g., vertically polarized).

By operating each link in accordance with an up-to-date mathematical model of the link, a system of the present invention more reliably operates closer to the ideal function of probability of detection illustrated by example in FIG. 8, discussed above. Put another way, by seeking to establish links in accordance with a such a model, one or more properties of an established link may be determined (e.g., the distance between a transmitting antenna and a receiving antenna may be more accurately predicted). Such a model may be expressly or implicitly used in methods for communicating with an identification device or locating an identification device. For example, one or more link thresholds may be determined in accordance with a model having numerous variables, each variable being set to a value in accordance with tests (e.g., tests as discussed above with reference to FIG. 3). To simplify testing and improve the accuracy of conclusions drawn from the model, a preferred model includes two or more independent variables. Variables are considered to be independent when the value of one independent variable does not always correspond to the same value of another independent variable. When a link includes a path at each of two frequencies and narrow band observations (e.g., tests) are made at one end of the link, the resulting measurements may participate in a model as values of independent variables. Table 1 lists features of systems of the present invention that may give rise to independent variables.

TABLE 1

| Feature(s) of System Architecture | Examples of Independent Variables |
|---|---|
| Media diversity | All properties of a signal conveyed using radio energy may be independent of all properties of a signal conveyed via other than radio energy, e.g., acoustic, ultrasonic, ultraviolet light, infrared light energy. Similarly, the magnetic and electric field properties of a signal conveyed in the radio spectrum may correspond to independent variables. |
| Directional diversity | Using directional antennas in a radio link, all properties of a signal received from a first direction (e.g., 238 of FIG. 2) may be independent of all properties of a signal received from a (suitably non-overlapping) direction. Any conventional directional antenna technique may be used (e.g., loop, yagi, phased array). Directional diversity may be used analogously in other media and implemented using any conventional apparatus (e.g., acoustic sensors employing directional strain gages, acoustic horns, lenses). |
| Signal magnitude diversity | A first range of magnitude may correspond to line-of-sight communication (e.g., 230 in FIG. 2) and other weaker magnitudes may correspond to first and second (or higher order) reflections (e.g., 234 and 238 respectively). Each range of magnitude may correspond to a different independent variable. |
| Signal polarization diversity | A first antenna may be selected from a variety of types or oriented so as to primarily communicate a narrow band of polarization(s) different from a second antenna. All properties of a signal communicated via the first antenna may be independent of all properties of a signal communicated via the second antenna and therefore correspond to different independent variables. |
| Signal timing diversity | A respective delay between a feature of a transmitted signal (e.g., rising edge) and a feature of each received signal (e.g., same or different feature) may correspond to an independent variable. In a radio system, a line-of-sight response may arrive sooner than a reflected response (e.g., compare the propagation along 236 and 238 to the propagation along 230 of FIG. 2). |
| Signal modulation diversity | Modulations may be selected to minimize the effects of noise sources that may differ in different frequency bands. For example, all properties of a signal conveyed using a first phase shift key modulation at a lower carrier frequency may be unrelated to any signal properties of a second phase shift key modulation at a higher carrier frequency. Respective signal properties (e.g., same or different) may therefore correspond to independent variables. |
| Redundant element diversity | For a radio link, parallel functional elements (e.g., parallel transmitters, receivers, antennas, or component functions of any of these) may be uniquely subject to different processes (e.g., temperature, noise, or available power). |

TABLE 1-continued

| Feature(s) of System Architecture | Examples of Independent Variables |
|---|---|
| | Each signal that passes through a different set of elements may correspond to a different independent variable. Suitable independence is provided, inter alia, by: antennas that are separated by about one wavelength of the primary operating frequency, or dipole antennas that are perpendicular to each other. |

In addition to combining any of the above features for obtaining a larger number of independent variables, some of the features may substitute for others. For example, a rotating directional antenna may be considered as directional diversity as well as timing diversity in as much as communication via the same direction is obtained at a periodic time. Diversity may be implemented simultaneously or sequentially. As an example of sequential diversity, note that timing diversity may concern multiple reception of a single transmission or sequential (e.g., periodically repeated) transmission-reception events.

Figure 4:
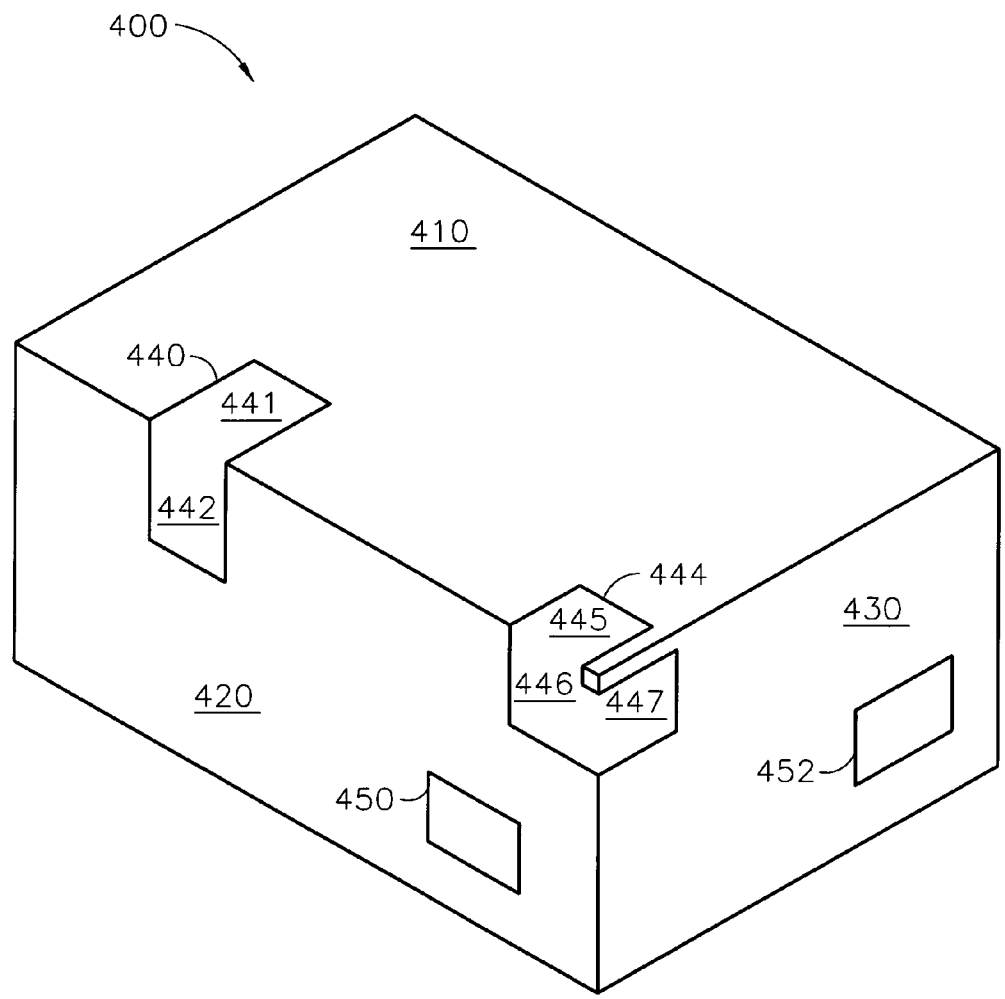
FIG. 4 is a perspective view of a shipping container having identification devices according to various aspects of the present invention.

For a link between a linker and an identification device, diversity for the purpose of determining the values of independent variables at the linker end (e.g., determination by linker 110, monitor 106, and/or host 102 as discussed above) may be implemented at either the linker or the identification device. For example, directional and/or polarization diversity may be accomplished by one or more identification devices located on the same object to be tracked. For purposes of illustration, object 400 (e.g., a conventional shipping box) of FIG. 4 includes mutually orthogonal sides 410, 420, and 430; identification devices 450 and 452 respectively co-planarly attached to sides 420 and 430; identification device 440 co-planarly attached to two sides 410 and 420; and identification device 444 co-planarly attached to three sides 410, 420, and 430. Identification devices on object 400 may respond with the same identification signal characteristics or codes.

An identification device may include an antenna of the type being substantially planar and subject to directional and/or polarization characteristics. Identification devices 450 and 451 each having an antenna of this type may be used in a manner that exhibits directional and/or polarization diversity when mounted on mutually perpendicular faces of an object, as shown. Identification devices may have more than one antenna of this type. Directional and/or polarization diversity may be obtained by using a different orientation with each antenna of a multiple antenna identification device. For example, identification device 440 has a portion 441 having a first antenna located on object 400 side 410 and has a portion 442 having a second antenna located on object 400 side 420. Further, identification device 444 has a portion 445 having a first antenna located on object 400 side 410, a portion 446 having a second antenna located on object 400 side 420, and has a portion 447 having a third antenna located on object 400 side 430. Antenna functions (e.g., for power absorption, resonance detection, message reception, and/or message transmission) may be identical in such an identification device (440 or 444) or may differ. When different, antenna functions may participate in the same link or different links.

Figure 5:
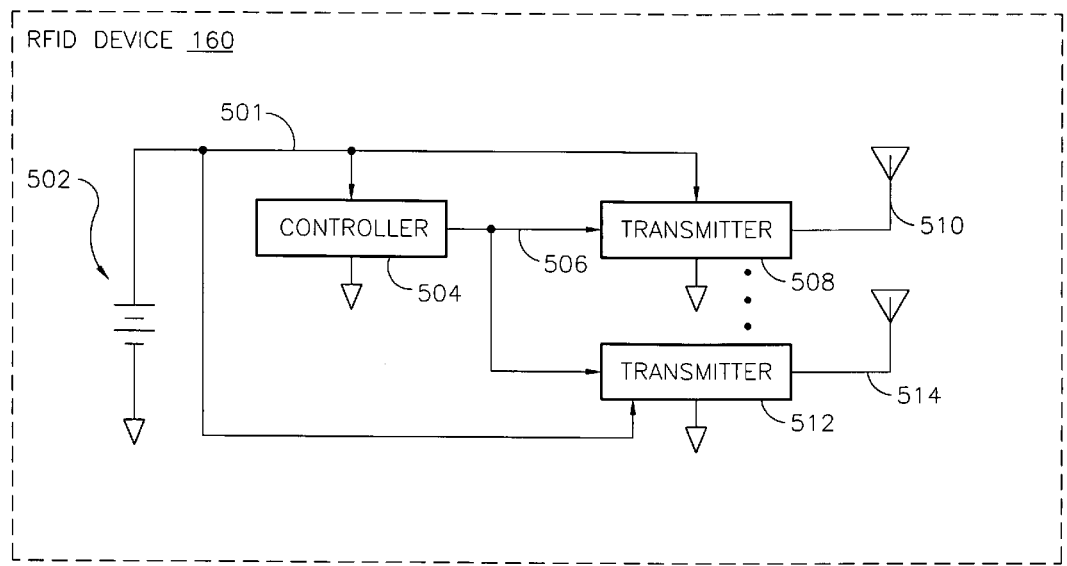
FIG. 5 is a functional block diagram of an identification device according to various aspects of the present invention.

An identification device according to various aspects of the present invention may facilitate media diversity, directional diversity, polarization diversity, signal timing diversity, signal modulation diversity, redundant element diversity, or any combination thereof. For example, a beacon identification device 160 of FIG. 5 includes battery 502, controller 504, and several transmit channels. Each transmit channel includes a transmitter (508 and 512) and a respective antenna (510 and 514). Battery 502 supplies power to the controller and transmitters via conductor 501. Controller 506 determines when any or all transmitters will transmit and what signal (e.g., content, frequency(ies), and/or modulation) each is to transmit. Any conventional components, circuitry, structures, materials, and techniques may be used to fabricate and assemble identification device 160.

Identification device 160 components, circuitry, structures, materials, and techniques for manufacture may be of any conventional type including the type described in the above referenced U.S. patent Ser. No. 09/372,274, suitably adapted for performing the functions described herein.

Media diversity may be implemented by substituting for any one or more transmit channels, a transmitter and interface to an alternate medium (e.g., a piezoelectric oscillator and a radiating surface for ultrasonic signaling).

Directional diversity and polarization diversity may be facilitated by employing antennas 510 and 514 with different antenna patterns, as discussed above.

Signal modulation diversity may be facilitated by employing respective different modulations in respective transmitters 508–512 and operating transmitters 508–512 in sequence or simultaneously.

Identification device 160 provides redundant element diversity by including more than one transmit channel. In an alternate implementation having several antennas coupled to one transmitter 508 (antenna element diversity), directional diversity and polarization diversity may be facilitated as discussed above and transmitter 512 may be omitted. In yet another implementation of element diversity, a common antenna (e.g., 510) is coupled to several transmitters (e.g., 508 and 512) and other antennas (e.g., 514) may be omitted.

Figure 6:
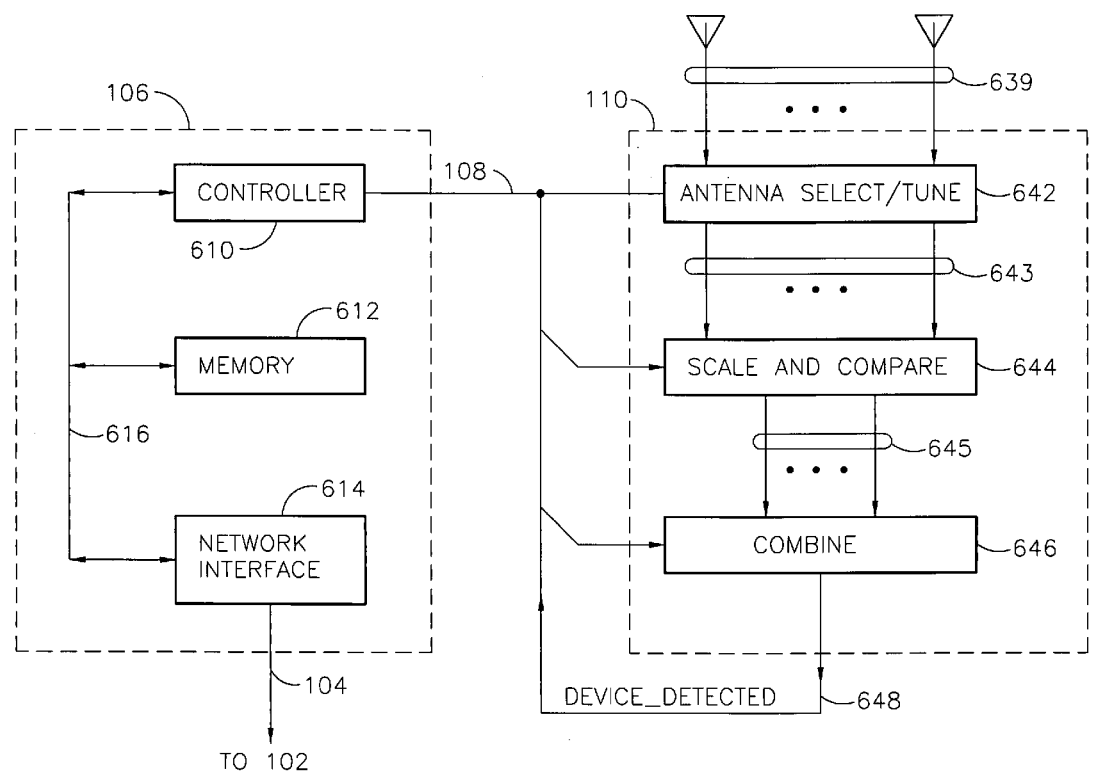
FIG. 6 is a functional block diagram of portions of the system of FIG. 1.

Functions of a linker and monitor may be divided to trade off complexity in the linker with computing capacity in the monitor. To avoid excessive computing requirements in a monitor, some computing tasks may be performed by multiple linkers in parallel (e.g., for several simultaneous links). In an exemplary implementation of a monitor and linker as shown in FIG. 6, monitor 106 includes controller 610, memory 612, and network interface 614, each coupled to a conventional data bus 616 for exchange of information, status, and control. Linker 110 includes antenna selection and tuning circuit 642, scaling and comparison circuit 614, and combine circuit 646. Monitor 106 and linker 110 may include any conventional mix of analog and digital circuitry, including circuitry of the type described for a monitor and antenna node in the above referenced U.S. patent application Ser. No. 09/372,274 suitably adapted to perform the functions described herein.

Memory 612 may include conventional RAM, ROM, PROM, and/or EPROM for storage of program steps executed by controller 610, information related to commands to be communicated on bus 108 to linker 110 as discussed above, and information related to communication to host computer 102 via bus 104 as discussed above.

Network interface 614 provides conventional bus interface protocol support between controller 610 and bus 104. Controller 610 may provide I/O read and write commands via bus 616 to network interface 614 to establish initial conditions for operations of network interface 614 (e.g., block transfer start addresses and lengths) and respond to error conditions. Network interface 614 may provide host computer 102 read and write access to memory 612. Network interface 614 facilitates transfer of any information and files between host computer 102 and memory 612.

Any number of antennas 639 (e.g., preferably between 2 and 6) may be coupled to linker 110. Each antenna may include any conventional antenna (e.g., loop, marconi, dipole, yagi, or dish) coupled to antenna selection and tuning circuit 642. Antenna selection and tuning circuit 642 may include circuits (e.g., including relays or semiconductor components) operative in response to conventional commands from controller 610 for: (a) impedance matching between antennas 639 and scaling and comparing circuit 644 and (b) selectively coupling one or more antennas 639 to scaling and comparing circuit 644.

Scaling and comparison circuit 644 receives signals 643 from antenna selection and tuning circuit 642. This circuit 644 may include circuits (e.g., including receivers, demodulators, attenuators, amplifiers, filters, analog comparators, digitizers, and/or digital comparators) operative in response to conventional commands from controller 610 for: (a) providing a predetermined number of normalized signals each in response to one or a series of measurements of one or more properties of an antenna signal, each normalized signal conveying indicia of a respective value of a corresponding independent variable and (b) performing a comparison to provide a binary result for each independent variable, the comparison performed with reference to one or more link thresholds. For example, a one bit binary result may be provided by an analog comparison of a signal amplitude (the indicia of a value of an independent variable) and an analog signal conveying a link threshold. When a multiple bit binary result is to be provided, the link threshold may specify a step size for analog to digital conversion.

Combine circuit 646 receives binary result signals 645 provided by scaling and comparison circuit 644. Combine circuit 646 may include circuits (e.g., logic gates, storage elements, arithmetic-logic units (ALUs) or a stored-program microprocessor) operative in response to conventional commands from controller 610 for: (a) selecting all or any subset of signals 645 for processing, (b) performing one or more logical operations to combine the states of respective independent variables so as to provide a resulting binary signal having indicia of detection. For example, combine circuit 646 may provide a one bit binary signal indicating that at least one identification device is detected. Alternately, circuit 646 may provide one or more binary results onto bus 108 comprising: (a) a one bit value (e.g., TAG_DETECTED), (b) indicia of the identity of the detected identification device, (c) indicia of whether a collision occurred, (d) indicia of a range of positions in which the identification device is expected to exist (e.g., a range of distance from a monitor, a range of distance from a linker, or a range of distance from a reference point such as an antenna or antenna cluster), and (e) indicia of the direction toward the identification device (e.g., a range of solid angle referenced from any convenient reference point such as a monitor, a linker, an antenna, or an antenna cluster).

Combination circuitry may employ one or more of the logical relations described in Table 2. In Table 2, independent variables are indicated by capital letters A through H. Each independent variable may correspond to a link as indicated on FIG. 1. For example, variables A, B, C, D, E, F, G, H, and K may correspond respectively to links 151, 152, 153, 154, 155, 156, 157, 158, and 159. In another implementation according to various aspects of the present invention, variables may correspond to paths of the same link. For example, variables C, D, and E may correspond to paths terminating at point 218 of FIG. 2, namely 230, 234, 238. As another example, identification device 160 may transmit a signal from one antenna that arrives (e.g., due to a reflection) at two antennas of linker 110, each antenna having a different antenna pattern. In response to the signal on each of these antennas, two independent variables may be assigned values corresponding to a property (e.g., amplitude) of the respective received signal. As yet another example, the values of independent variables may be obtained from the same identification device (from a minimum of transmit and receive channels) yet at a diversity of times, as discussed above.

TABLE 2

| Logical Expression | Description |
| --- | --- |
| A AND B | Redundant communication may decrease false positives. Where an intersection of different antenna patterns is predetermined, the location of an identification device may be determined. Any number of variables may be combined with the AND logical operator, for example, C AND D AND E. |
| A OR B | Alternative communication may decrease incomplete identification. The OR logical operator may be used, inter alia, where different noise sources exist, where diversity of modulation is employed, or where redundant element diversity is employed. Any number of variables may be combined using the OR logical operator. |
| (A OR B) AND (NOT C) | Any combination of logical operators (e.g., AND, OR, NOT, EXCLUSIVE OR) may be used with any combination of diversity. By employing a logical expression that includes both AND and OR logical operators, the benefits of each will be obtained as discussed above with reference to use of logical operators of only one type (e.g., all AND operators). |
| (C AND D) OR (D AND E) OR (C AND E) | A logical expression may be first order (e.g., C AND D) or a higher order (e.g., second order as at left). Detection accuracy and reliability may improve in proportion to the number of independent variables included in the logical expression(s) used for detection. |
| (F AND G) OR (H AND K) (F OR G) AND (H OR K) | The choice of first order or higher order expressions, the choice of which binary results to combine, and the selection of the logical operators in one or more logical expressions may be made to accommodate a particular implementation and installation described, for example, by particular system implementation details (e.g., antenna placement and RFID capabilities) and in accordance with installation details (e.g., location of obstructions in the facility) |
| SUM(C, D, E) > 1 SUM(F, G, H, K) ≧ 2 0.5 * SUM(F, G) + 0.7 SUM(H, K) ≧ 2 | A voting strategy may be implemented by algebraic (or arithmetic) summation of numeric (or binary) values. The summation may be a weighted sum (or any polynomial expression) of variables compared to a limit (minimum or maximum). |

Monitor 106 and linker 110 may cooperate to provide any combination of the diversities discussed above. Because the incremental cost of an identification device tends to dominate the system cost in a system having thousands of identification devices and few monitors and linkers, it is preferred to implement directional diversity, signal magnitude diversity, signal polarization diversity, signal timing diversity, signal modulation diversity, and/or redundant element diversity primarily in the linker and/or monitor. For example, multiple antennas, multiple receiver circuits, and/or multiple demodulation circuits may be implemented in linker 110 as discussed above for the beacon type identification device detection system described in part with reference to FIGS. 5 and 6.

Controller 610 may include circuits and/or software to implement a closed loop control system for maintaining a link. For example, when an expected identification device is no longer being detected, controller 610 may take steps to effect any of the following actions: (a) specify use of one or more different antenna patterns (e.g., by suitably directing and/or adjusting transmitter output power, receiver sensitivity, antenna selection, or tuning with signals to circuit 642), (b) specify use of different scaling and comparison functions (e.g., by suitably directing and/or adjusting circuit 614), or (c) specify a different combination operation (e.g., by suitably directing and/or adjusting combine circuit 646, or using a different method of detection, e.g., as discussed below with reference to method 700 and step 708). Once the expected identification device is again detected, further link maintenance actions may be taken to provide added system stability, for example, by setting timers or values (e.g., lower or upper limits) to effect hysteresis. When detection of an expected identification device becomes less reliable, system 100 may provide a warning display, message, or alarm.

A method according to various aspects of the present invention for determining whether an identification device is detected may include the following steps: (a) in a system having a diversity of the set consisting of media diversity, directional diversity, signal magnitude diversity, signal polarization diversity, signal timing diversity, signal modulation diversity, and redundant element diversity, enabling circuitry to provide indicia of at least two independent variables; (b) determining a binary result for each independent variable; (c) selecting, from a plurality of predetermined methods, a method for forming a logical combination; and (d) determining that the identification device is detected in accordance with performing the method to form a logical combination in accordance with the plurality of binary results.

Figure 7:
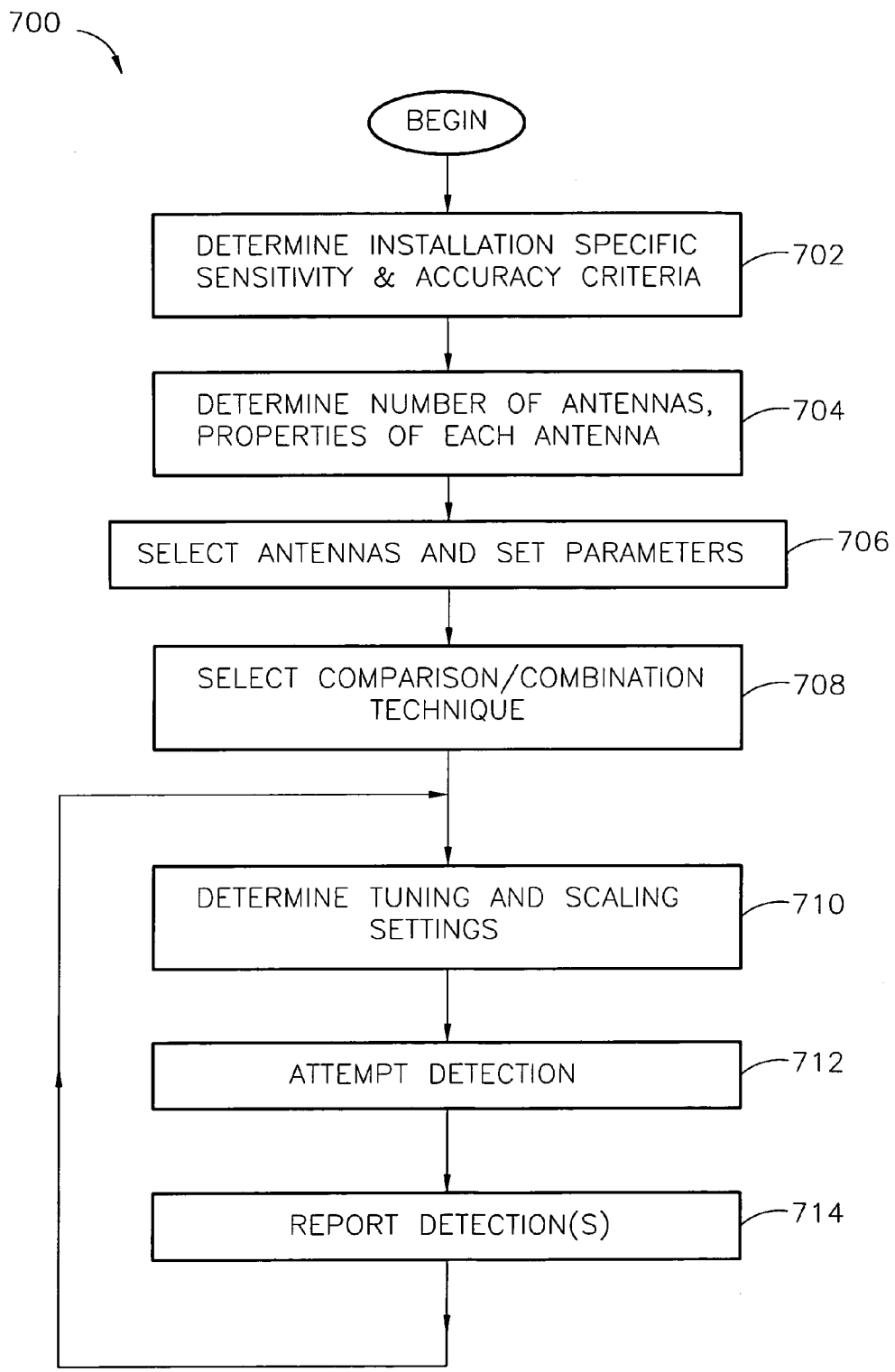
FIG. 7 is a flow chart of a method according to various aspects of the present invention.

Method 700 of FIG. 7 is an example of such a method applied to a system having a diversity of antennas and a diversity of antenna patterns (e.g., a combination of directional diversity, signal polarization diversity, and redundant element diversity). Instructions for performing method 700 may be stored in memory 612 and performed by controller 610. By performing method 700, host computer 102 periodically receives up-to-date reports of the detection of identification devices that are in-range. Criteria for defining a condition of in-range may be initially set or may be subject to change (e.g., responsive to operator controls, responsive to methods for physically locating desired identification devices, and/or responsive to physical changes in the installation or the facility). When a set of criteria has been established, installation specific sensitivity and accuracy criteria may be determined (step 702), for example, by reading indicia of the same from memory 612 (e.g., as stored there as a result of interaction with an operator or by host computer 102).

In response to obtaining these criteria, the characteristics of each of a number of available antennas are determined (step 704). Antenna characteristics may be predetermined and stored by host computer 102 in memory 612. Alternatively, linker 110 (or host, monitor, and/or linker in cooperation) may determine antenna characteristics in situ initially or periodically and store results in memory 612. Linker 110 may include a processor (not shown) and memory (not shown) respectively for testing and storing antenna characteristics (e.g., also used in antenna tuning). Access to or transfer of relevant contents of linker memory may be prerequisite to controller 610 determining antenna characteristics.

The number of antennas to be used for identification device detection is established next (step 706). For example, antennas to be used may be selectively coupled to scaling and comparison circuit 644 as discussed above. Alternately, antennas not to be used may be rendered ineffective (e.g., by squelching antenna signals or by superimposing a signal to indicate that the antenna signal is not to be used for combination).

Configuration of multiple receive channels may be accomplished by conventional digital control techniques. Registers having outputs that control RF and/or analog switches may be set by commands from controller 610 (step 706). Automatic tuning of antennas to appropriate receive frequencies may be accomplished by transferring information from tables stored in memory 612 to registers similar to registers that operate matrix switches for antenna selection. Other parameters may be set in a similar manner for digitally controlled circuits 644 for scaling (e.g., ladders, programmable amplifiers), setting analog thresholds (e.g., by ladders or D/A converters) for analog comparison, and setting digital thresholds (e.g., registers) for digital comparison. The task of setting parameters may be accomplished in full (e.g., as an initialization) at step 706 or repeated throughout detection, as illustrated in part in step 710 discussed below.

Logical expression(s) to be used to determine identification device detection (e.g., as described above with reference to Table 2) may be stored in memory 612 as metacode including logical operators and references to variables. Such metacode may be formatted and interpreted in any conventional manner. Storage as metacode may facilitate description of system operation to a user or facilitate modification and maintenance. In a preferred implementation, performance of one or more logical expressions for identification device detection is direct: the logic of the expression is carried out by executable instructions (e.g., object code resulting from compilation or assembly).

As such, logical expressions exist in memory 612 as subroutines to be performed as subparts of the method of comparing and/or combining. Any conventional technique may be used to enable (step 708) the performance of a desired subroutine. For example, pointers may be given (or linked to) desired values, case switches may be initialized with switch values, or messages may be sent to initialize particular program objects.

To establish a current value for each variable referenced by the method for comparing and/or combining selected in step 708, parametric settings different from the parametric settings set in step 706 may be appropriate. For example, if two antennas having different patterns are enabled to supply two values for two respective independent variables to a logical expression such as "A OR B", then the settings in step 706 may be sufficient and step 710 may be omitted. On the other hand, for example, when an integrating receiver must be swept through a band or an antenna must be swept through an angle to acquire one such value for an independent variable, then a determination of tuning, scaling, and comparison thresholds (step 712) may be needed for each attempt at detection. In yet another implementation, step 712 is repeated until values for all variables have been supplied to the selected method of comparing and combining.

An evaluation of one or more logical expressions supplied with values of variables as discussed above is accomplished, according to various aspects of the present invention, by performing a method of comparing and/or combining (step 712). Such a method may be predetermined, may be selected (step 708), or may be partly predetermined as to some variables and selected as to other variables. Faster execution may result from establishing a portion or all of the method of comparing and combining as a predetermined method.

Each logical expression discussed above with reference to Table 2 provides a one-bit binary value. In combination with other information obtained in accordance with signals received from selected antennas, such a one-bit value may connote whether or not an identification device with a particular identity has been detected. A report of detection may be provided (step 714) to host computer 102. Such a report may take any convenient form such as a conventional message, file, or indicia in a region of memory 612 that may be accessed independently by host 102. The report may alternately or in addition indicate that more than one identification device has been detected without error, or that a collision has occurred.

Several steps of method 700 may be organized into a loop for repeating surveillance and detection of (a) changes in the population of identification devices that may be in-range; or (b) changes in the parameters that define the extent of in-range. For example, after reporting (step 714), control may pass back: (a) to the beginning (step 702) to test for (or implement) a change in the type(s) of diversity used for detection of identification devices or a change in installation information as discussed above, (b) to selection of an alternate for antennas and/or settings of parameters (step 706), (c) to selection of an alternate method for comparing and/or combining (step 708), or (d) to determining an alternate for tuning, scaling, and/or comparison settings (step 710).

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A method for determining whether a radio frequency identification device is detected, the method comprising:
    selecting a plurality of different antenna patterns, each antenna pattern configured to receive a signal corresponding to an independent variable;
    determining a plurality of results each responsive to whether a respective communication link provides a respective signal having a respective amplitude exceeding a respective threshold, each communication link operative in accordance with at least one of the selected antenna patterns;
    selecting, from a plurality of predetermined logical combinations a logical combination; and
    determining whether the radio frequency identification device is detected in accordance with the logical combination and in accordance with the plurality of results;
    wherein R1, R2, R3, and R4 represent four results of the plurality of results, and at least one logical combination operates in accordance with the logical expression: (R1 OR R2) AND (R3 OR R4).

2. The method of claim 1 wherein each respective threshold is equal to a common threshold value.

3. The method of claim 1 wherein at least one of the respective communication links comprises:
    a. a receiver; and
    b. an antenna coupled to the receiver, wherein the antenna and the receiver cooperate in accordance with the respective antenna pattern.

4. The method of claim 1 wherein at least one of the respective communication links comprises:
    a. a transmitter; and
    b. an antenna coupled to the transmitter, wherein the antenna and the transmitter cooperate in accordance with the respective antenna pattern.

5. The method of claim 1 wherein each selected antenna pattern has a different polarization.

6. The method of claim 1 wherein each selected antenna pattern has a different direction of maximum effectiveness as an antenna.

7. The method of claim 1 wherein at least one logical combination operates in accordance with a logical OR of at least two of the plurality of results.

8. The method of claim 1 wherein at least one logical combination operates in accordance with a logical AND of at least two of the plurality of results.

9. A memory comprising indicia of instructions for performing the method of claim 1 by a data processing circuit.

10. A method for determining whether a radio frequency identification device is detected, the method comprising:
    selecting a plurality of different antenna patterns, each antenna pattern configured to receive a signal corresponding to an independent variable;
    determining a plurality of results each responsive to whether a respective communication link provides a respective signal having a respective amplitude exceeding a respective threshold, each communication link operative in accordance with at least one of the selected antenna patterns;
    selecting, from a plurality of predetermined logical combinations a logical combination; and
    determining whether the radio frequency identification device is detected in accordance with the logical combination and in accordance with the plurality of results;
    wherein R1, R2, R3, and R4 represent four results of the plurality of results, and at least one logical combination operates in accordance with the logical expression: (R1 AND R2) OR (R3 AND R4).

11. A method for determining whether a radio frequency identification device is detected, the method comprising:
    selecting a plurality of different antenna patterns, each antenna pattern configured to receive a signal corresponding to an independent variable;
    determining a plurality of results each responsive to whether a respective communication link provides a respective signal having a respective amplitude exceeding a respective threshold, each communication link operative in accordance with at least one of the selected antenna patterns;
    selecting, from a plurality of predetermined logical combinations a logical combination; and
    determining whether the radio frequency identification device is detected in accordance with the logical combination and in accordance with the plurality of results;
    wherein at least one logical combination operates in accordance with whether a sum of the plurality of results exceeds a predetermined quantity.

12. An object identification system comprising:

means for selecting a plurality of different antenna patterns, each antenna pattern configured to receive a signal corresponding to an independent variable;

means for determining a plurality of results each responsive to whether a respective communication link provides a respective signal having a respective amplitude exceeding a respective threshold, each communication link operative in accordance with at least one of the selected antenna patterns;

means for selecting, from a plurality of predetermined logical combinations, a logical combination; and means for determining whether the radio frequency identification device is detected in accordance with the logical combination and in accordance with the plurality of results;

wherein R1, R2, R3, and R4 represent four results of the plurality of results, and at least one logical combination operates in accordance with the logical expression: (R1 OR R2) AND (R3 OR R4).

13. An object identification system comprising:

means for selecting a plurality of different antenna patterns, each antenna pattern configured to receive a signal corresponding to an independent variable;

means for determining a plurality of results each responsive to whether a respective communication link provides a respective signal having a respective amplitude exceeding a respective threshold, each communication link operative in accordance with at least one of the selected antenna patterns;

means for selecting, from a plurality of predetermined logical combinations, a logical combination; and means for determining whether the radio frequency identification device is detected in accordance with the logical combination and in accordance with the plurality of results;

wherein R1, R2, R3, and R4 represent four results of the plurality of results, and at least one logical combination operates in accordance with the logical expression: (R1 AND R2) OR (R3 AND R4).

* * * * *